Patented Oct. 17, 1950

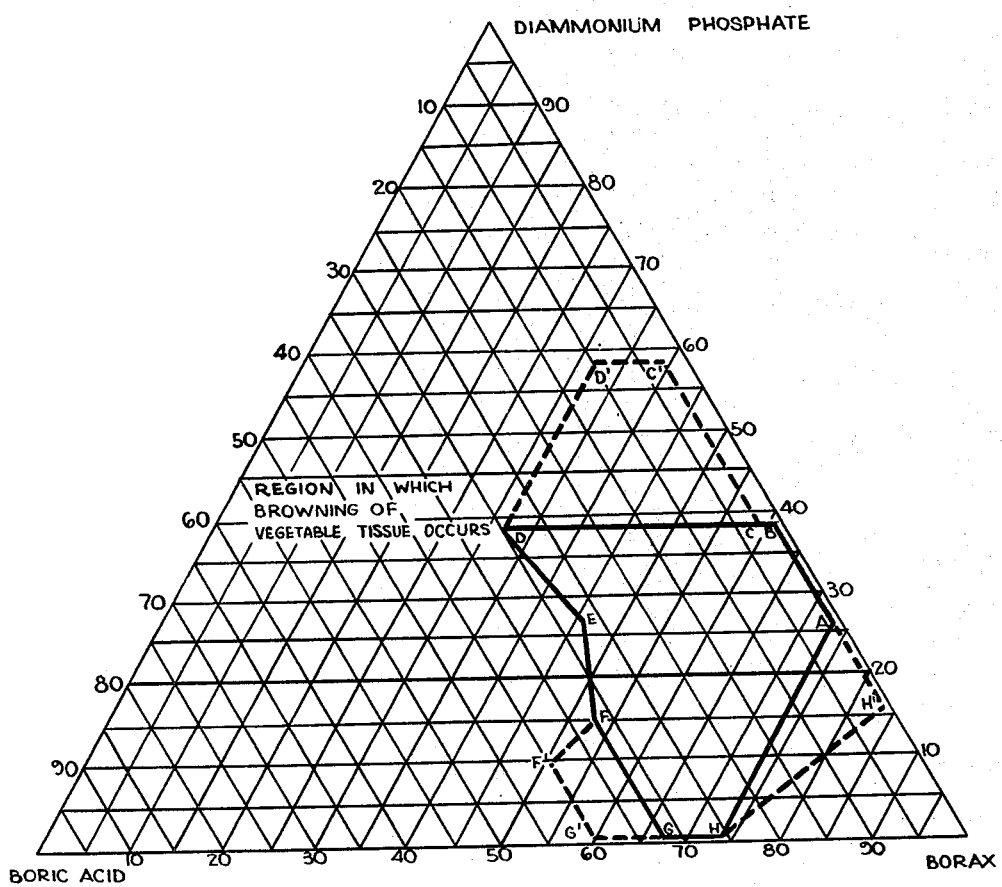

2,526,083

UNITED STATES PATENT OFFICE 2,526,083

METHOD OF FIREPROOFING CHLOROPHYLL CONTAINING MATERIALS

Morris L. Nielsen, Dayton, Ohio, assignor to Monsanto Chemical Company, St. Louis, Mo., a corporation of Delaware Application July 30, 1948, Serial No. 41,553

3 Claims. (Cl. 106—15)

The present invention is concerned with the fireproofing of various vegetable products to render them safe when subjected to conditions which would otherwise cause the combustion and possible explosion of such materials.

It is an object of the invention to provide a composition compatible with various vegetable products to render them fireproof even when subjected to very high temperatures. A specific object is to provide a chemical composition which may be applied to articles commonly used in the home to render them fireproof and safe for use by children.

It is also an object of the invention to fireproof decorations derived from vegetable sources such as Christmas trees and wreaths, which ordinarily are extremely hazardous in their susceptibility to fire, and to render such materials fireproof to the extent that when placed in contact with a live flame such materials may char, but will not burst into flame, nor support combustion when removed from a flame.

It has been found that prior art fireproofing compositions such as borax are unsatisfactory for general use, since they may make the material to which they are applied very hard or unattractive, because of the horny, crystalline film or coating which they leave upon the base material.

While the borax has been utilized in the past in certain treatments intended to reduce the flammability of various materials, it has been found that the crystalline nature of this material as shown by the large, rough crystals which are deposited from an aqueous solution, render the use of this material impossible for any purposes in which the feel or hand of the base substance must be considered. Thus, in fabrics and in ornamentation which may be handled, it has been found that borax is undesirable and that the large crystals easily slough off, thereby losing any possible fireproof qualities.

Boric acid is also subject to the difficulty of powdering very readily when the solvent has evaporated. Consequently, the use of boric acid as such is undesirable since the compound leaves the base material so readily that the fireproofing effect is lost after a very short time.

Diammonium phosphate, when used alone, is also inefficient because of its crystalline nature, and by reason of the low viscosity of its solutions which does not permit sufficient material to be retained on the surface to be effective.

Flameproofing compositions utilizing the above ingredients have been known in the past, but have been characterized by a harsh, rough finish instead of a smooth, glassy coating, such as is desirable in treating vegetable-derived materials such as may be utilized for ornamentation. The property of roughness is not important in an air filter, for example, but is extremely undesirable when the appearance, feel or handling qualities must be preserved.

The present invention is concerned with a process and compositions which overcome the difficulties of the prior art by providing compositions of matter which yield unusually attractive, glassy, transparent coatings that do not crack or become embrittled with use.

The fireproofing composition of the present invention is composed essentially of a mixture of borax, boric acid and diammonium phosphate within the particular critical range of concentrations which is set out below.

The relationship among the three constituents of the fireproofing compositions is such as to provide a transparent, viscous water solution having a hydrogen ion potential (pH) within a range such as to prevent browning and deterioration of vegetable materials to which the composition is applied. It is, therefore, necessary that the concentrations be maintained within the limits defined below and as illustrated graphically in Figure 1. It is shown in Figure 1, in which the area of the polygon, ABCC'D'DEFF'G'HH' represents the ternary system of the present three ingredients, that borax must be present in the range of 32 to 82 parts by weight; boric acid, 1 to 40 parts by weight; and diammonium phosphate, 1 to 58 parts by weight, in which system the total finished composition represents 100 parts by weight of solids. A preferred composition particularly adapted for use with trees, wreaths and other ornamentation derived from vegetable sources (particularly the class of evergreens as preferred embodiments) consists of: borax, 56 parts; boric acid, 24 parts; and diammonium phosphate, 20 parts. The inorganic salts set forth above may be utilized in anhydrous form or as hydrated compounds providing that the calculated anhydrous salts be present within the limits here defined.

A preferred range of compositions which provide particularly effective glassy coatings is defined within the limits represented by the area of the polygon defined by the solid lines ABCDEFGH in Figure 1.

The drawing of the present application, Figure 1, shows in diagrammatic form the ranges of compositions in which satisfactory products are obtained fulfilling the requirements of a transparent material sufficiently viscous to be applied to a base material to give a transparent glassy coating. The coating does not become embrittled with use and does not adversely affect the beauty of the base material while still fulfilling the requirements of complete flame-proofness and a pH at which no harm results to the vegetable material to which the composition is applied.

In carrying out the process of the present invention, compositions of diammonium phosphate, borax and boric acid are applied as solutions in which the solid ingredients are represented in the proportions set out above and as shown in the accompanying drawing which is a part of the present specification. Such solutions may be made with water to give a syrupy solution in which the solids content may range from small percentages to saturation to allow thin or thick coatings to be applied. The solutions may be utilized for spraying or the vegetable-derived base material may be dipped into the said solution. The particular concentration which is employed may be selected with the objectives in mind of obtaining particular thicknesses of coatings or to obtain the desired viscosity which is necessary for spraying or dipping.

For application the temperature of the solution is preferably maintained above 40° C. Application of the dissolved mixture to fireproof various vegetable products may be carried out at any convenient temperature since the particular ternary system represents compositions having a high solubility. The treated materials embodying a vegetable-derived product in combination with the glassy coating of the system of diammonium phosphate, borax, and boric acid are stable for long periods of time even in the dry atmosphere which is common in dwelling houses and indoor meeting and business places.

Illustrative of the invention, but not limitative in character, the following example illustrates in greater detail the method by which the compositions of the invention may be produced and utilized.

Example I

A dry mix is prepared from 56 parts by weight of borax, 24 parts of boric acid and 20 parts of diammonium phosphate. To apply the composition, it is first dissolved in about 30 parts of water to give a low viscosity solution. The solution is maintained at about 50° C. Branches of fir, spruce and pine trees dipped into this solution and then dried at room temperature show an attractive, glassy, non-crystalline coating. Such branches when subjected to fire will not blaze, since the coating intumesces with the production of gas to provide an extremely adherent insulating layer which prevents combustion even when test pieces are held directly in a flame.

Example II 420 grams borax
180 grams boric acid
400 grams diammonium phosphate The components were dissolved in 300 grams of hot water, with heating and stirring. The clear solution was allowed to cool to 40 to 50° C., and applied by dipping to a small wreath of northern spruce. After drying, the coating was transparent and adherent. No discoloration occurred. The coating puffed up when heated, effectively sealing off the combustible material from contact with flame and air.

Example III 54 grams borax
6 grams boric acid
40 grams diammonium phosphate

The above materials were dissolved in 900 grams of water at room temperature. This solution was applied to cotton cloth by padding. When dry, the weight increase of the cloth was 11.1%. The cloth was flameproofed, giving a char length of 4.0 inches over a vertical Bunsen burner by the standard A. S. T. M. test, D626—41T. The hand of the cloth was smooth and non-harshened.

Example IV 15.2 pounds borax
6.5 pounds boric acid
5.4 pounds diammonium phosphate The dry crystalline materials were mixed together and allowed to stand one week. A uniform portion was then dissolved in water using about three pints of water for every 10 pounds of dry preparation. The solution, after heating and stirring, was clear, transparent, and somewhat viscous. It was cooled to about 115° F. and applied to a small balsam fir tree by spraying. When dry and cool, the coating was transparent and non-tacky. It was entirely effective in preventing spread of flame through the tree.

It has been found that the compositions of the present invention are particularly useful in that they function by melting or intumescing at relatively low temperatures whereby they form a glassy covering over the base material. This glassy coating adheres to the base material so that an impervious coating is provided to prevent the burning of the vegetable-derived base.

By vegetable-derived material, I mean cellulose and regenerated cellulose products and also wood and lignin, including various fabricated forms such as wallboard, fiber-board, insulating board. Thus, in the use of the compositions of the present invention on ornamentation, such as may be used in the home or in window displays, it is contemplated that such base materials may be made of cellulose or regenerated cellulose, and that wood as a base substance is also within the scope of the invention.

In addition to the use of the particular critical concentrations of borax, boric acid and diammonium phosphate as set out above, it is possible to substitute mono-ammonium phosphate for the diammonium phosphate of the above mixture. In the same relationship, the phosphate component may be supplied as phosphoric acid to a mixture of the other constituents, together with the use of ammonia to bring the pH of the final mixture to the range of 7.0 to 8.5.

The pH of the aqueous solution of the above materials is desirably maintained in the range of 7.0 to 8.5 to prevent tendering of fabrics derived from vegetable sources. It has been found that this pH range is most desirable to prevent such tendering or decomposition of the base material. It has also been found that in the application of the compositions of the present invention to vegetable-derived ornamentation, such as wreaths and Christmas trees, that the pH be desirably maintained in the range of 7.0 to 8.5 in order to preserve the attractive green coloration of the original vegetable material. Consequently green vegetable material having the green color of chlorophyl may be treated by the process of the present invention to retain a fresh appearance concomitant with the valuable property of being flameproof.

Another advantage of the fire-resistant compositions of the present invention is that the treated vegetable products obtained by the process of the invention exhibit practically no corrosive effects to ferrous metals placed in contact with the treated materials. For this reason, metallic fastening members and ornamental decorations may be employed freely in connection with the treated materials.

It will be obvious to those skilled in the art that considerable variation in the relative proportions of the components of the ternary system is possible within the scope of the invention, and that various means of applying the materials in accordance with the process of the invention may be devised. Having now described my invention, I wish it to be understood that the invention is not to be limited to the specific form or compositions herein-described and shown, or specifically covered by my claims.

What is claimed and is desired to be secured by Letters Patent of the United States is:

1. The method of flameproofing a chlorophyll containing vegetable-derived material to preserve the green color thereof which comprises treating said material with a solution containing diammonium phosphate, borax and boric acid in the relative proportions such that the said ingredients lie within the area defined approximately in the accompanying figure by the polygon ABCDEFGHA.

2. The method of flameproofing a chlorophyll containing vegetable-derived material to preserve the green color thereof which comprises treating said material with a solution containing diammonium phosphate, borax and boric acid in the relative proportions such that the said ingredients lie within the area defined approximately in the accompanying figure by the polygon ABCC'D'DEFF''G'HH'A.

3. The method of flameproofing a chlorophyll containing vegetable-derived material to preserve the green color thereof which comprises treating said material with a solution of a mixture comprising essentially 56 per cent by weight of borax, 24 per cent by weight of boric acid and 20 per cent by weight of diammonium phosphate.

MORRIS L. NIELSEN.

REFERENCES CITED

The following references are of record in the file of this patent:

UNITED STATES PATENTS

| Number | Name | Date |
|---|---|---|
| 2,078,197 | Hooker et al. | Apr. 20, 1937 |

FOREIGN PATENTS

| Number | Country | Date |
|---|---|---|
| 767,396 | France | May 1, 1934 |
| 540,642 | Great Britain | Oct. 24, 1941 |
| 11,320 | Great Britain | of 1911 |